US006813907B2

(12) United States Patent
Dawes et al.

(10) Patent No.: US 6,813,907 B2
(45) Date of Patent: Nov. 9, 2004

(54) FLUORINE DOPING A SOOT PREFORM

(75) Inventors: Steven B. Dawes, Corning, NY (US);
William W. Johnson, Painted Post, NY (US); Jason A. LaCoe, Tioga, PA (US); Michael T. Murtagh, Horseheads, NY (US); Pushkar Tandon, Corning, NY (US)

(73) Assignee: Corning Incorporated, Corning, NY (US)

( * ) Notice: Subject to any disclaimer, the term of this patent is extended or adjusted under 35 U.S.C. 154(b) by 247 days.

(21) Appl. No.: 09/999,553

(22) Filed: Nov. 30, 2001

(65) Prior Publication Data

US 2003/0101771 A1 Jun. 5, 2003

(51) Int. Cl.⁷ .............................................. C03B 37/075
(52) U.S. Cl. ......................................... 65/397; 65/399
(58) Field of Search ..................... 65/397, 399, 422, 65/426, 429

(56) References Cited

U.S. PATENT DOCUMENTS

| 4,557,561 A | 12/1985 | Schneider et al. ........ 350/96.34 |
| 4,586,943 A | 5/1986 | Kyoto et al. .................. 65/3.12 |
| 4,620,861 A | 11/1986 | Berkey ........................ 65/3.12 |
| 4,627,866 A | * 12/1986 | Kanamori et al. ............ 65/3.12 |
| 4,629,485 A | 12/1986 | Berkey ........................ 65/3.11 |
| 4,737,179 A | 4/1988 | Tanaka et al. ................ 65/3.12 |
| 4,812,155 A | 3/1989 | Kyoto et al. .................. 65/3.12 |
| 5,217,516 A | 6/1993 | Ishiguro et al. .............. 65/3.11 |
| 5,221,309 A | 6/1993 | Kyoto et al. .................. 65/3.12 |
| 5,361,319 A | 11/1994 | Antos et al. ................. 385/123 |
| 5,509,101 A | 4/1996 | Gilliland et al. ............. 385/142 |
| 5,681,365 A | 10/1997 | Gilliland et al. ............. 65/377 |
| 5,895,515 A | 4/1999 | Ishikawa et al. .............. 65/377 |
| 5,917,109 A | 6/1999 | Berkey ........................ 65/412 |

FOREIGN PATENT DOCUMENTS

| EP | 0 146 659 A1 | 12/1983 | ........... C03C/13/04 |
| EP | 0 780 345 A1 | 12/1996 | ............. C03C/3/06 |
| EP | 0 878 451 A1 | 5/1998 | ............. C03C/3/06 |
| EP | 0 901 989 A1 | 9/1998 | ........... C03B/19/14 |
| WO | 01 83399 | 4/2001 | ......... C03B/37/104 |

OTHER PUBLICATIONS

English Abstract of JP7291635A2, "Production of Synthetic Quartz Glass Member" issued Nov. 7, 1995 from Delphion.

English Abstract of JP11116248A2,"Synthetic Quartz Glass Member" issued Apr. 27, 1999 from Delphion.

English Abstract of JP59184740A2, "Manufacture of Base Quartz Material for Optical Fiber" issued Oct. 20, 1984 from Delphion.

English Abstract of JP59162143A2, "Production of Synthetic Quartz" issued Sep. 13, 1984 from Delphion.

* cited by examiner

Primary Examiner—Peter Chin
(74) Attorney, Agent, or Firm—Timothy R. Krogh; Kevin M. Able

(57) ABSTRACT

The invention includes a method of incorporating fluorine into a preform that may be used to produce an optical article. A method that may be used to practice the invention includes a method of making an optical fiber preform. The method includes reacting a fluorine containing precursor in a flame of a combustion burner without forming a soot, thereby forming a fluorine doping atmosphere. A further method that may be practiced to practice the invention includes the step reacting at least a fluorine containing precursor in a flame of a combustion burner, wherein the precursors reacted in the flame are substantially devoid of the element of silicon, thereby forming a fluorine containing atmosphere for the doping of a soot preform. An additional method that may be used to practice the invention includes the step of reacting at least one precursor in the flame of a combustion burner, wherein said precursors comprise at least one fluorine containing compound and the precursors are substantially free of any silicon containing compound, and the additional step of directing a reaction product of said reacting step toward a soot preform.

33 Claims, 11 Drawing Sheets

SINGLE TRAVERSING BURNER

ARRAY OF END-BURNERS

FIG. 7 SOOTLESS DOPING

FIG. 8 F DISTRIBUTION USING SOOTLESS FLAME DOPING

FIG. 9 SOOTLESS F DOPING 45 MINUTES WITH LOW WATER AND STANDARD METHANE CONDITIONS

FIG. 11
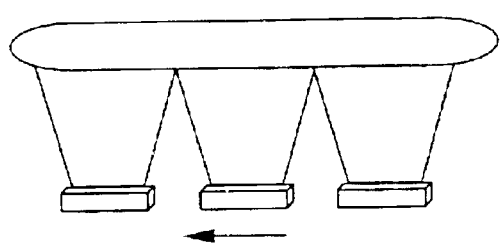
ARRAY OF END-BURNERS
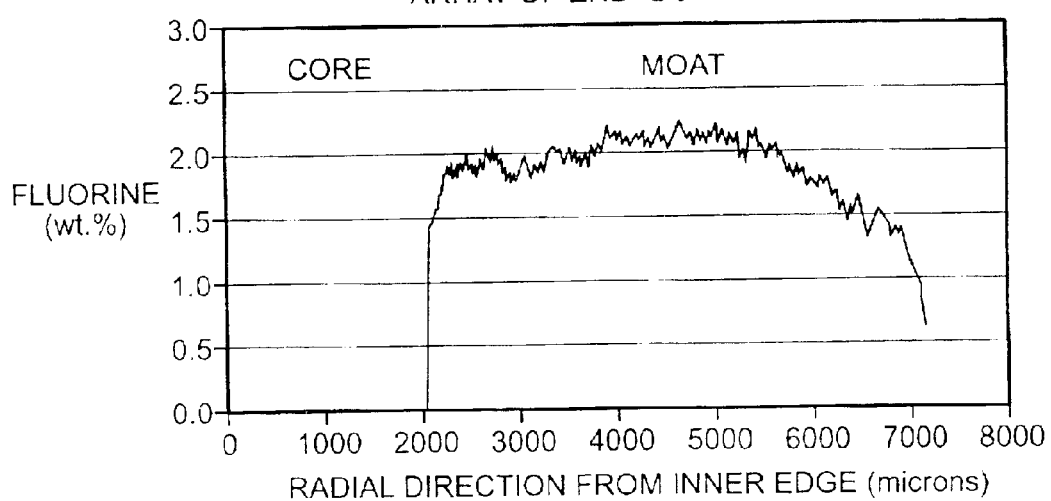

FLUORINE DOPING A SOOT PREFORM

BACKGROUND OF THE INVENTION

1. Field of the Invention

The present invention relates generally to the manufacturing of optical fibers, and particularly to manufacturing a fluorine doped preform from which an optical fiber may be drawn from the preform.

2. Technical Background

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications has begun and is expected to increase.

Optical fibers having a fluorine doped region have unique attributes in the areas of long haul optical fibers, dispersion compensating optical fibers, dispersion slope compensating optical fibers, and high data rate optical fibers. The ability to include fluorine in a preform is an important aspect of producing an optical fiber with a fluorine doped region.

Prior attempts to incorporate fluorine into the preform include depositing fluorine doped soot on a starting member. Typically, the starting member was a sintered core cane. However, in the past, deposited fluorine has exhibited significant migration from the region or regions of interest and loss, such that depositing fluorinated soot was not a practical manner to produce a fluorinated soot preform. Preforms fluorinated during deposition have exhibited a fluorine loss between forty (40%) percent to fifty (50%) percent. One reason for the low retention rate of fluorine is the production of the compound $SiF_4$ during manufacturing. Typically $SiF_4$ generated during manufacturing will volatilize off.

Furthermore deposition of fluorine also has not been able to achieve the necessary moat depth for optical fibers that require a region with a weight percent of fluorine of at least 1.0% at a practical deposition rate. For example, to achieve a weight of 2.5% fluorine, in the past the fluorinated soot has been deposited at a rate of 0.2 g/min or less, whereas, non-fluorine doped soot can be deposited at a rate of greater than about 2 grams per minute. Generally as the amount of fluorine desired to be incorporated into the soot preform increases, the deposition rate of the fluorinated soot decreases. This is very troublesome, for the reason that many of the dispersion managed fibers require the fiber to have a region with a fluorine weight percent of at least about 3.0%.

Additionally, during the production of fluorine doped soot at traditional rates of soot deposition, an etching reaction can occur. The etching reaction retards soot nucleation and likewise inhibits the soot deposition rate.

Another issue with the deposition of fluorine doped soot is pollution abatement. Fluorine deposition process creates soot particles, which include one or more fluorine atoms. The separation of the fluorine from the soot particles is a costly and timely process.

A fluorine doping method is needed that enables deeper moat levels which does not reduce deposition rates to impractical levels and that enables less costly methods of pollution abatement.

SUMMARY OF THE INVENTION

One aspect of the present invention is a method of making an optical fiber containing a fluorine doped region. The method includes reacting a fluorine containing precursor in a flame of a combustion burner without forming a soot, thereby forming a fluorine doping atmosphere.

Another aspect of the invention includes a method of doping an optical fiber preform. The second method includes reacting at least a fluorine containing precursor in a flame of a combustion burner, wherein the precursors reacted in the flame are substantially devoid of the element of silicon, thereby forming a fluorine containing atmosphere for the doping of a soot preform.

An additional aspect of the invention is a method of making an optical fiber. This method includes the steps of: (1) reacting at least one precursor in the flame of a combustion burner, wherein said precursors comprise at least one fluorine containing compound and said precursors are substantially free of any silicon containing compound capable of forming a soot particle, and (2) directing a reaction product of said reacting step toward a soot preform.

Practicing the described aspects of the invention will result in the advantage of producing a fluorine doped soot preform in just one deposition step. A further advantage that will result from practicing the above methods is an efficient use of fluorine. Additional advantages of the invention include the ability to achieve high doping levels, the ability to achieve fast deposition and process rates, efficient use of precursors, and lower pollution abatement costs. The aforementioned invention may be used to preferentially dope a soot preform with fluorine and not dope fluorine dope soot particles in the flame of a burner.

Practicing the aforementioned aspects of the invention can be used to produce a fluorine doped soot preform that is doped during deposition. The above method may be used to improve the uniformity of the refractive index of a fluorine doped region of the preform. Other advantages of practicing the above method include incorporating into the preform an increased amount of fluorine dopant and less of the dopant is lost in the effluent, and the drawn fiber may exhibit deeper index profiles than fibers previously fluorinated during deposition. The above methods of the invention may be used to produce an optical fiber with a fluorine doped section having a delta ($\Delta$) of at least about –0.35% or more negative. The above methods may be practiced to produce a fiber with a fluorine doped region having at least about 1.5 weight percent of fluorine, more preferably at least about 3.0 weight percent of fluorine.

Additional advantages that will result from practicing the described aspects of the invention is that the fiber may be formed with a minimal number of transfers steps, the perform is not doped during consolidation, the preform is not doped during sintering, high concentrations of HF can be formed which will result in higher fluorine concentrations in the preform, the partial pressure of HF in the doping atmosphere may be maintained substantially constant, the temperature of the burner may be optimized to favor the formation of HF, surface area, in terms of area per mass, may be optimized for incorporating F into the soot preform, and HF is a suitable compound for water based pollution remediation techniques.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIGS. 10 and 11 are graphs of the fluorine wt % of a soot preform in terms of radius of the preform.

DETAILED DESCRIPTION OF THE INVENTION

Figure 1:
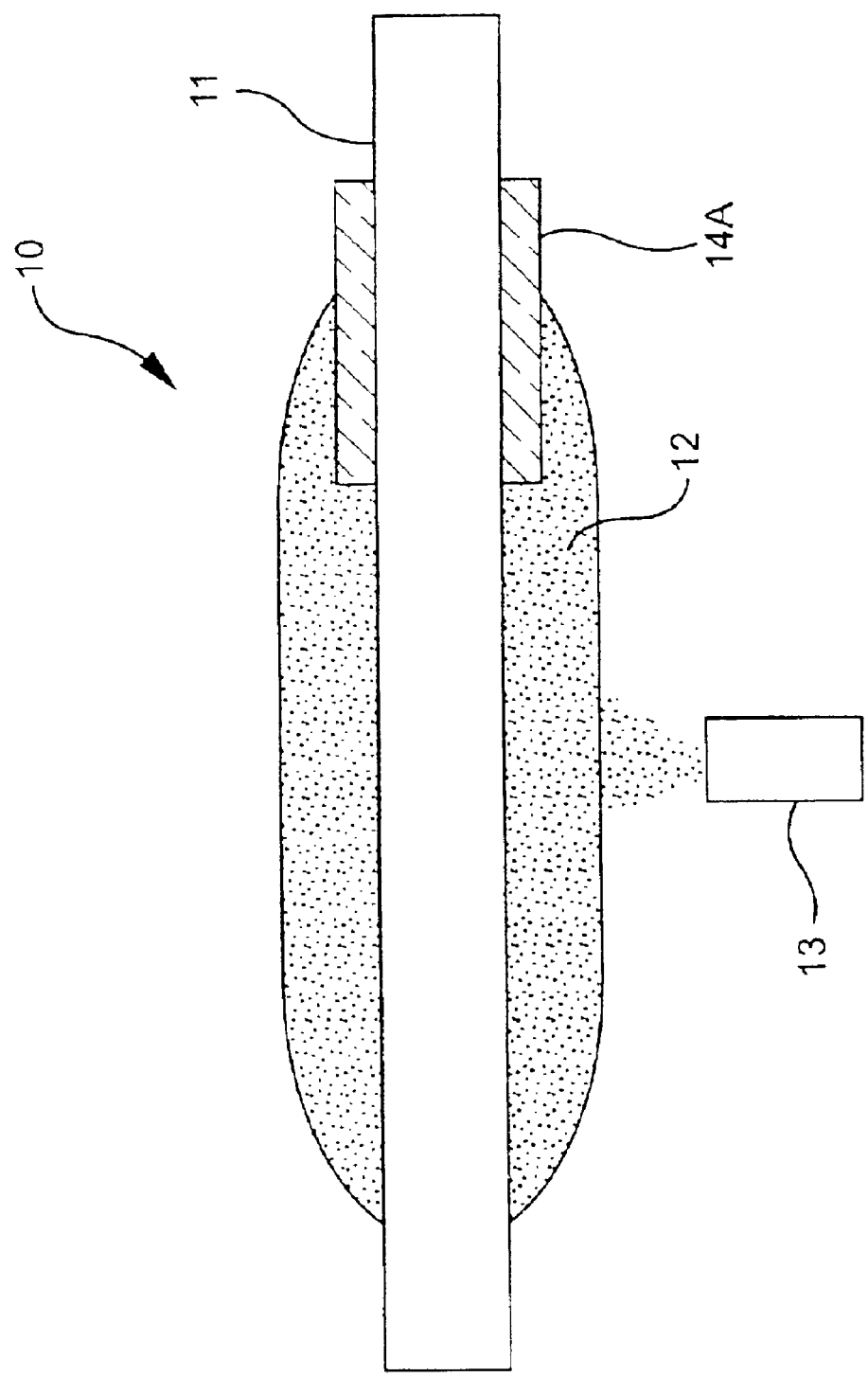
FIG. 1 is a schematic cross sectional view of a soot deposition process.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of a soot preform for use in the present invention is shown in FIG. 1, and is designated generally throughout by reference numeral 10.

As shown in FIG. 1, a soot preform 12 is formed from a chemical vapor deposition ("CVD") process. Preform 12 can be formed by various CVD processes such as outside vapor deposition ("OVD"), vapor axial deposition ("VAD"), and outside plasma chemical vapor deposition ("OPCVD"). In FIG. 1, soot is deposited via OVD, from burner 13 onto a starting member 11 to form preform 12. The starting member is preferably an aluminia mandrel. Also shown is a handle 14A attached to starting member 11.

Preferably, the soot being deposited is silica based soot. Typically silica based soot is formed from a precursor that comprises a silicon containing compound, such as a silicon halide (e.g. $SiCl_4$), an alkoxy silicon, a siloxane (e.g. $C_8H_{24}O_4Si_4$), an alkyl silicon and combinations thereof. The silica based soot may be doped silica or undoped silica. Soot is used herein to mean at least unconsolidated silica based glass particles.

Preferably, preform 12 may have one or more regions of doped silica soot. For example, but not limited to, a radial region of the preform may be silica soot doped with at least one of the following elements Ge, P, Al, Sb, Ta, F, B, Ga, In, Sb, Er, Li, Na, K, Rb, Cs, Be, Mg, Ca, Sr, Ba, Ti, Se, Te, Fr, Ra, Bi, or mixtures thereof. Preform 12 may also have one or more regions of undoped silica soot. It is most preferred that an outer region of preform 12 is undoped silica soot. In one preferred embodiment of preform 12, preform 12 is formed by depositing a first region of silica soot doped with a refractive index increasing dopant, followed by a second region of silica soot. In a second preferred embodiment of preform 12, preform 12 is formed by depositing a first region of silica soot doped with a refractive index increasing dopant, such as germanium (e.g. having a $\Delta_1$), a second region of silica soot having little or no germanium dopant, such as undoped silica soot, (e.g. having a $\Delta_2$), a third region of germanium doped silica soot (a.k.a. ring, region) (e.g. having a $\Delta_3$), and a fourth region of silica soot, such as undoped silica soot, (e.g. having a $\Delta_4$), wherein $\Delta_1 > \Delta_3 > \Delta_2 \geq \Delta_4$. Each respective delta is calculated in accordance with the following formula: $\Delta_a = (n_a^2 - n_b^2)/(2n_a^2) \times 100\%$, $n_a$ being the refractive index of a particular region of the optical fiber, such as regions 1, 2, 3, or 4 and $n_b$ being the refractive index of the cladding.

It is also preferred that soot preform 12 is porous with a substantially constant density. Preform 12 should have a density of less than about 2.1 $g/cm^3$. Preferably, preform 12 has a density of about 0.1 to about 1.2 $g/cm^3$, more preferably about 0.2 to about 0.8 $g/cm^3$, even more preferably about 0.4 to about 0.6 $g/cm^3$, and most preferably about 0.35 to about 0.5 $g/cm^3$. Preferably, the above density is the preform density after deposition and before any subsequent processing. Preferably, the above density is a localized density. A localized density is defined herein as a density of a predetermined portion of the preform for a predetermined volume of the preform, e.g. about one cubic centimeter sample of the preform. It is further preferred that preform 12 is substantially devoid of any physical interface or sintered glass regions. An example of a physical interface would include a barrier layer such as an annular region of sintered glass in the preform. More preferably, soot preform 12 is formed in a single deposition step.

Preferably, the soot is deposited at a rate of at least about 2 grams/minute, more preferably at least about 4 grams/minute, and even more preferably at least about 5 grams/minute. For addition background regarding soot deposition patent application WO 99/32410 is incorporated herein by reference in its entirety.

Figure 2:
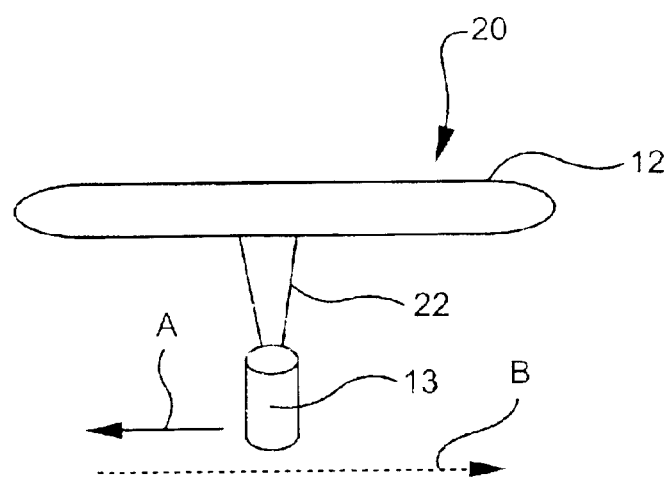
FIG. 2 is a schematic side view of the fluorine doping of a preform in accordance with the invention.

An embodiment of the invention is illustrated in FIG. 2, generally designated 20. FIG. 2 includes perform 12 and burner 13 as shown in FIG. 1. Burner 13 traverses along the length of the preform 13 in the directions of arrows A and B. FIG. 2 further includes a flame 22. In an alternate embodiment of FIG. 2, burner 13 may be aligned axially to preform 12 similarly to the burner and preform configuration in a VAD process. Preferably flame 22 comprises a flame substantially devoid of soot also known as a substantially sootless flame.

Figure 3:
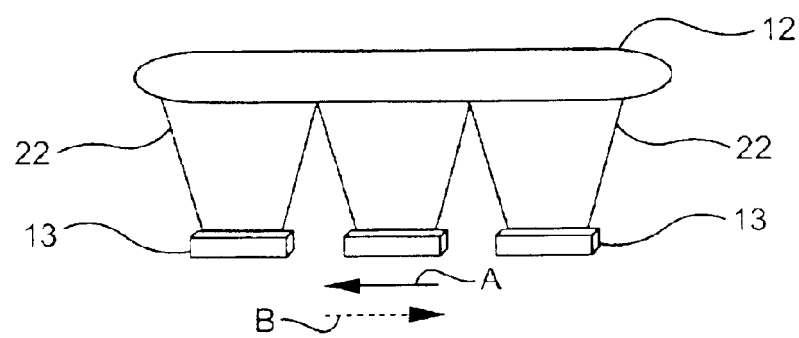
FIG. 3 is a schematic side view of the fluorine doping of a preform in accordance with the invention of any additional embodiment of the invention.

In an alternate embodiment to FIG. 2, burner 13 may comprise a plurality of burners as shown in FIG. 3, generally designated 30. As illustrated in FIG. 3, burner 13 comprises 3 burners, however, this embodiment of the invention is not limited to any particular number of burners. Any number of burners such as 2 or more burners may be used to practice this embodiment of the invention. Optionally the burners 13 in FIG. 3, may traverse in the directions of arrows A and B. Preferably, the traverse of burners 13 is synchronized. Preferably, the cumulative length of flames 22 comprises at least a majority of the axial length of preform 12 and more preferably substantially the entire length of preform 12. This multi-burner embodiment of the invention has the advantage of maintaining the surface of preform 12 at a substantially constant temperature. Substantially constant is used in here to describe a temperature range or temperature gradient of less than about 20° C., preferably less than about 15° C., more preferably less than about 10° C., and most preferably less than about 5° C. Advantages of using an array of burners includes maintaining the surface of preform 12 at a substantially constant temperature and maintaining a constant HF partial pressure along the entire surface of preform 12. A result of the above advantages is the ability to incorporate greater amounts of fluorine into preform 12 than compared to fluorine doping preform 12 with a single traversing burner.

In a variation of the alternate embodiment, the plurality of burners may comprise one or more burners that traverse along at least a segment of the length of preform 12 and at least one end burner positioned at one end of preform 12. Preferably, the variation of the alternate embodiment includes at least one end burner at each end of preform 12.

A fluorine dopant for doping preform 12 with fluorine is preferably formed in flame 22. Preferably flame 22 includes at least one of the following compounds as source for fluorine $CF_4$, $SiF_4$, $C_2F_6$, $SF_6$, $F_2$, $C_3F_8$, $NF_3$, $ClF_3$, $BF_3$, and combinations thereof. $CF_4$ is a more preferred fluorine source. Flame 22 may include a hydrogen containing fuel source, such as $CH_4$, $H_2$, or any other combustible hydrocarbon, or a substantially hydrogen free fuel such as carbon monoxide. Furthermore, the fuel may comprise an anhydrous compound. For additional background regarding a substantially hydrogen free fuel, U.S. patent application Ser. No. 09/833540 filed on or about Apr. 11, 2001, and any parent application of the U.S. patent application, is incorporated herein by reference in its entirety. Optional flame 22 may include other materials such as oxygen (e.g. $O_2$), a sulfur containing compound, a chlorine containing compound (e.g. $Cl_2$), or an inert material such as nitrogen, argon, helium, or combinations thereof.

In one embodiment of flame 22, it is preferred that the ratio of fluorine to hydrogen comprises at least about 1:1, more preferably at least about 1.45:1. In a second embodiment of flame 22, preferably the ratio comprises at least about 2:1. The ratio of fluorine to hydrogen may optionally be at least about 3:1. At ratios of at least about 1:1, it is believed that $COF_2$ compounds as well as other compounds that are reactive with silica soot are formed. However, the invention is not limited to any particular F:H ratio.

Preferably, flame 22 is substantially devoid of any silicon containing compound that may be reacted in flame 22 to form a soot particle. Optionally, flame 22 may be substantially devoid of any compound, which contains silicon. However, flame 22 may include silicon-containing compounds which are not capable of forming soot particles, e.g. a silicon containing fluorine precursor such as $SiF_4$. It is further preferred that flame 22 is substantially free of soot or glass particles.

It is further preferred that a hydrolysis reaction of the fluorine containing precursor occurs in flame 22. A non-exhaustive example of a preferred non-stoichiometric hydrolysis reaction comprises: $CH_4+O_2+CF_4 \square$ HF. By products of the reaction may comprise anyone of the following compounds $H_2O$, CO, $CO_2$, $F_2$, $COF_2$, and combinations thereof. If the reactants include a source of sulfur, the reaction by products may include $S_2F_2$, $SOF_2$, and combinations thereof. Preferably a by-product of the reaction includes at least one compound that will react with any water molecules that may be formed during a doping reaction of HF reacting with the silica of preform 12. The doping reaction comprises: $HF+SiO_2 \square SiO_{3/2}F+H_2O$. More preferably flame 22 includes at least about 0.1% by volume at least one component of the group which comprises COF, $COF_2$, $COF_3$, $S_2F_2$, $SOF_2$, and combinations thereof. $COF_2$, $S_2F_2$, $SOF_2$, and combinations are examples of compounds that will react with water molecules formed during the doping reaction. Furthermore, it is preferred that flame 22 includes at least about 0.1% by volume of at least one fluorine containing compound which is substantially devoid of hydrogen. The one fluorine containing compound substantially devoid of hydrogen may comprise the same compound as the aforementioned group of compounds of COF, $COF_2$, $COF_3$, $S_2F_2$, $SOF_2$, and combinations thereof or a different compound.

Preferably the reaction temperature of the above hydrolysis reaction comprises at least about 500° C., more preferably at least about 600° C., and even more preferably at least about 800° C. It is further preferred that the reaction temperature comprises no more than about 1400° C., more preferably no more than about 1250° C., even more preferably no more than about 1200° C., and most preferably less than about 1100° C. It is further preferred that the reaction temperature is below the sintering temperature of preform 12.

A time period to form the doping atmosphere required to dope preform 12 will depend on the level of fluorine that is desired to be incorporated into preform 12. The longer the hydrolysis reaction is conducted, the greater the amount of fluorine doping atmosphere that will form and the more fluorine that will be available to be incorporated into preform 12. Typical doping time periods include up to about 10 minutes, up to about 20 minutes, up to about 40 minutes, up to about 60 minutes, up to about 90 minutes, up to about 120 minutes, and up to about 180 minutes. In a preform having a diameter of about 5 cm, the fluorine concentration can achieve up to about 3wt. % after a 20 minute doping period and up to about 4 wt. % after a 40 minute doping period.

An embodiment of the invention comprises a method of making an optical fiber preform. The method includes reacting a fluorine containing precursor in a flame of a combustion burner without forming a soot, thereby forming a fluorine doping atmosphere. The method may or may not include directing the atmosphere toward a soot preform. Optionally, the method may further comprise preheating a soot preform to a substantially uniform radial temperature below the sintering temperature of a soot preform. Preferably the soot perform is preheated for no more than about 60 minutes, more preferably no more than about 30 minutes. Substantially uniform radial temperature is used herein to mean at least a radial temperature gradient of less than about 20° C. per mm, preferably less than about 15° C. per mm, more preferably less than about 10° C. per mm, and most preferably less than about 5° C. per mm. Additionally, the method may further comprise maintaining a partial pressure of fluorine in the doping atmosphere created from said reacting at a substantially constant value. Substantially constant partial pressure of fluorine is defined herein to mean at least within about 10%, more preferably within about 5%, and even more preferably within about 3%. Examples of typical partial pressures of fluorine that may be achieved during the reacting step include up to about 0.50 atms, up to about 0.58 atms, about 0.60 atms, about 0.67 atoms, up to about 0.70 atms, and up to about 0.80 atms. FactSage™ version 5.0 software from GTT-Technologies Gmbh, Herzogenrath, Germany may be used to determine the partial pressure of HF in the doping atmosphere.

Figure 4A:
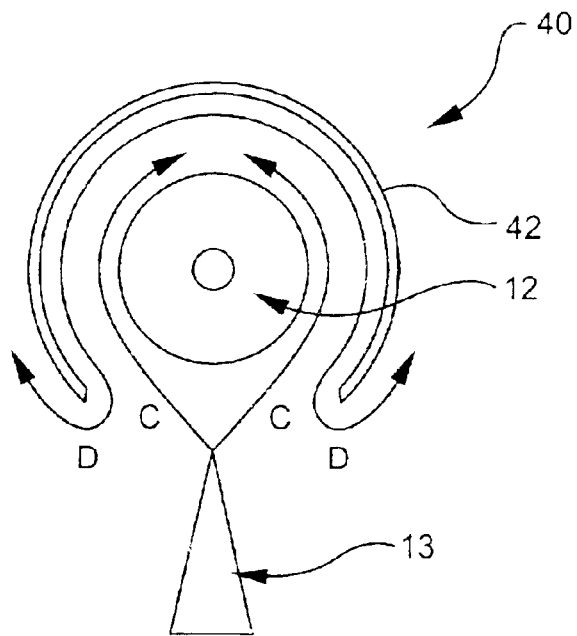
FIG. 4A is a schematic top view of the fluorine doping of a preform in accordance with the invention which includes an enclosure.

Additional optional embodiments of the method of the invention are illustrated in FIGS. 4A (generally designated 40) and 4B (generally designated 45). As shown in FIG. 4A, the invention may optionally include the step of enclosing preform 12 in an enclosure apparatus 42. Preferably element 42 partially encloses preform 12 which restricts the flow of the reaction products to around an outer surface of preform 12. Preferably, apparatus 42 is within about 12 cm of preform 12. More preferably within about 6 cm of preform 12, even more preferably within about 5 cm of preform 12, and most preferably within about 2 cm of preform 12. It is preferred that the apparatus 42 is constructed from a material that can acts as an insulator or of a material that will deflect heat back toward preform 12.

In an embodiment of FIG. 4A, apparatus 42 substantially encircles preform 12 and apparatus 42 includes a longitudinal slot. Preferably, the slot is about the same length of as preform 12. Flame 22 is aligned to dope preform 12 through the longitudinal slot.

Advantages of the embodiment shown in FIG. 4A include increasing the residence time of the reaction products in proximity to preform 12. The hydrolysis reaction products will flow into enclosure 42 in the general direction of arrows C and out of enclosures 42 in the general direction of arrows D. It is theorized that the increased residence time will result in more fluorine dopant incorporated into preform 12 and less dopant escaping in the effluent. The embodiment shown in FIG. 4A may also enable the flow rate of precursors and/or the fuel for flame 22 to be reduced and to minimize heat loss of preform 12.

Figure 4B:
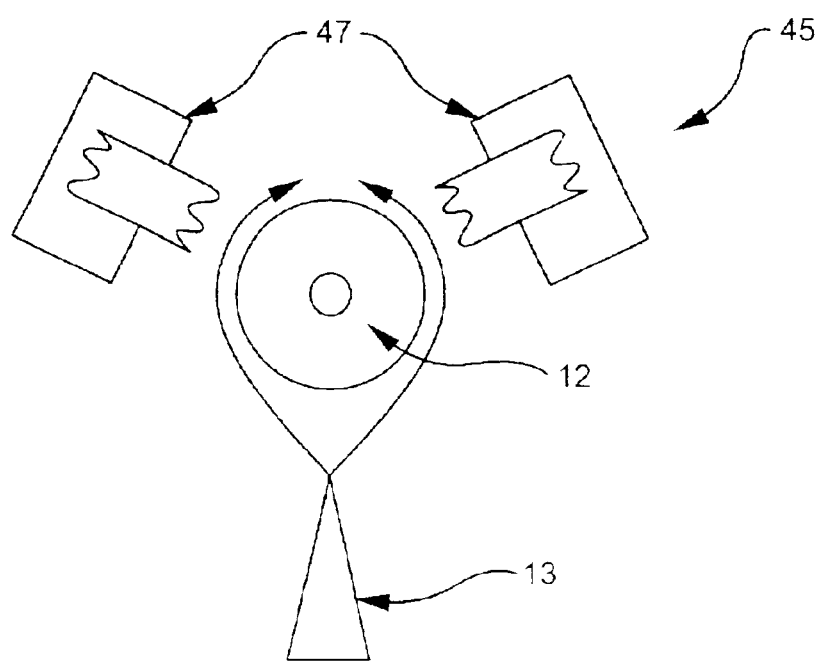
FIG. 4B is a schematic top view of the fluorine doping of a preform in accordance with the invention, which includes one or more heat sources.

As shown in FIG. 4B, a method of the invention may optionally include applying heat to a soot preform by a source other than the burner during said reacting step. In this embodiment of the invention another heat source is used to apply heat to preform 12. The other source may be used to apply heat to preform 12 in conjunction with flame 22 or in the place of flame 22. The other source may be a single source or a plurality of sources. Preferably, if more than one source (including the flame) is used to apply heat to preform 12, the sources are equally spaced around preform 12.

As shown in FIG. 4B, the other source may include one of more heat lamps 47. Preferably, heat lamps 47 are radiant heat lamps. An advantage of practicing this method of invention includes further optimization and efficient use of reactants, such as the precursors and the fuel.

An additional method that may be used to practice the invention includes a method of doping an optical fiber preform. The method includes the step of reacting at least a fluorine containing precursor in a flame of a combustion burner, wherein the precursors reacted in the flame are substantially devoid of the element of silicon, thereby forming a fluorine containing atmosphere for the doping of a soot preform.

A further method that may be used to practice the invention includes a method of making an optical fiber. The method includes the step of reacting at least one precursor in the flame of a combustion burner, wherein said precursors comprise at least one fluorine containing compound and said precursors are substantially free of any silicon containing compound that can be reacted in flame 22 and form a soot particle. The method also includes the step of directing a reaction product of said reacting step toward a soot preform.

Once preform 12 is doped with fluorine, preform 12 may be (1) sintered and drawn into an optical fiber; (2) sintered a drawn into a cane; or (3) sintered, additional soot deposited onto the sintered preform to form an overcladded preform and the overcladded preform may be sintered and drawn into a fiber. The aforementioned process to form an optical fiber will be described in greater detail below.

Figure 5:
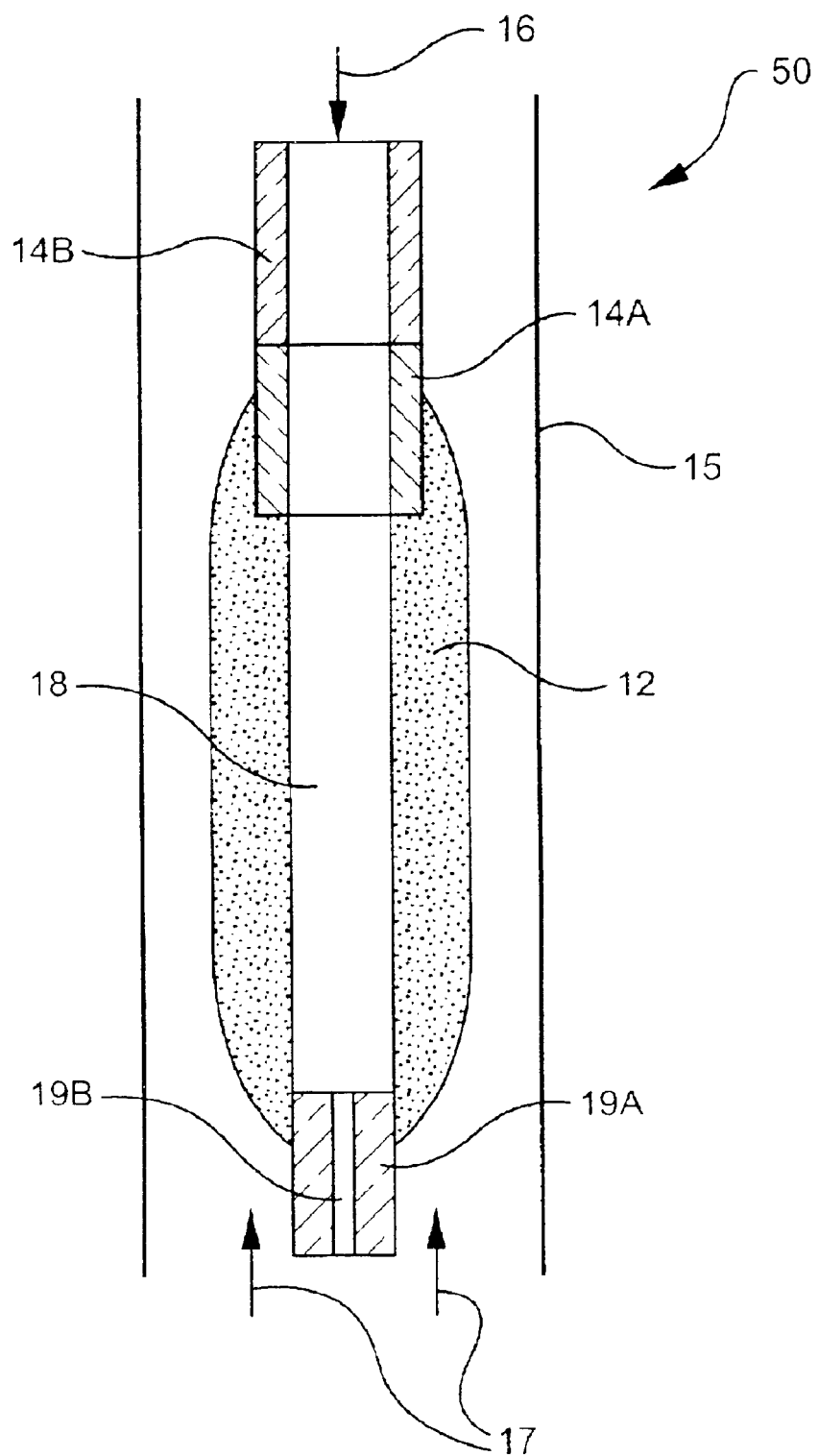
FIG. 5 is a schematic cross sectional view of a porous soot preform in a furnace.

As designated by reference numeral 50 in FIG. 5, preform 12 is suspended in a furnace 15. As shown in FIG. 5, a ball joint 14B is attached to handle 14A. Preform 12 also includes a center passageway 18 and a plug 19A with an optional capillary tube 19B. Plug 19A and ball joint 14B are not required to practice the invention.

Furnace 15 is charged with a gas that flows in the direction of arrows 17. The gas contains the drying agent. The drying agent is a gas that contains a halide and optionally a reducing agent as described in U.S. patent application Ser. No. 09/671790 filed on or about Sep. 27, 2001. Preferably the gas includes an inert material such as helium, nitrogen, argon, or mixtures thereof. The present invention is not limited to only the listed inert material. The halide may be present in the drying agent in a pure form or as an element of a compound. For example, the halide may be present in the form of $Cl_2$, $SiCl_4$, or germanium tetrachloride.

The gas may be charged into furnace 15 during a drying operation of preform 12 or during consolidation of preform 12. In the case that furnace 15 is charged during a drying phase, preform 12 is heated to a drying temperature of about 1000 to about 1200° C., inside furnace 15. Preferably, preform 12 is heated to about 1100 to about 1200° C., with respect to a drying temperature, the drying agent may be used to dry a preform at temperatures above about 1600° C., for a glass composition that would sinter at temperatures above about 1600° C.

Preform 12 is maintained at the drying temperature for a period of about one (1) to about four (4) hours. It is preferred that furnace 15 is maintained at the drying temperature for about four (4) hours. Drying the preform will result in drier preforms (a.k.a. blanks) which a fiber may be drawn from.

During the drying process, the halide will react with a hydrogen element or a hydrogen associated with a water molecule or a hydroxyl molecule. The halide may also react with a metal ion of a present metal oxide or the alkali metal ion of a present alkali metal oxide in the soot.

After drying preform 12, optionally center passage 18 is closed and the preform is consolidated. One technique to close passage 18 is applying vacuum to center passage 18. Optionally, the preform 12 may be doped with fluorine or any other dopant in a consolidation doping step.

Preferably, any heat treating step prior to sintering results in a reduction in an average pore size of the pores of preform 12 of at least about twenty (20%) percent, further preferred at least about thirty (30%) percent, more preferably at least about forty (40%) percent, and most preferably at least about fifty (50%) percent. Typically, preform 12 will have pores of about 0.1 to about 1.0 $\mu$m, preferably, the pore size after heat treating may range from about 0.05 to about 0.8 $\mu$m depending on the starting size of the pore.

To consolidate perform 12, the drying agent is discharged from furnace 15 and furnace 15 is heated to a temperature of about 1250 to about 1600° C. It is preferred that sintering occurs in an inert atmosphere, such as helium. A suitable period of time for preform 12 to sinter is about one (1) to six (6) hours. In a preferred embodiment, the sintering time is four (4) to six (6) hours. However, the sintering period may vary depending on the sintering temperature, the size and density of the preform, and the chemical composition of the preform. Sintering may occur in the same furnace as drying or in a different furnace.

The sintered preform may be drawn into a fiber. The sintered preform is heated to a temperature of about 1800° C. or more and drawn into a fiber. Preferably, the sintered preform is transported to a draw furnace for drawing the preform into the fiber. It is preferred that a muffle is disposed at an exit of the drawing furnace. The fiber is pulled by tractors and stored on a spool. Typical draw rates are 20 m/s or more.

In another embodiment, the drying may take place during sintering. In this embodiment, the drying gas is charged into furnace 15 and furnace 15 is heated to the aforementioned sintering temperature range.

An additional embodiment of the invention includes depositing soot onto a core cane. The soot deposited onto the core cane, preferably, should have a refractive index that is equal to or less than the refractive index of the core region of the core cane. It is preferred that the refractive index of the soot is less than the refractive index of the core region of the core cane. An example of a preferred material deposited on the core cane is silica ($SiO_2$). The silica may be doped with a refractive index increasing dopant or a refractive index decreasing dopant. The soot coated core cane may be referred to as an overcladded core cane or an overcladded preform.

Figure 6:
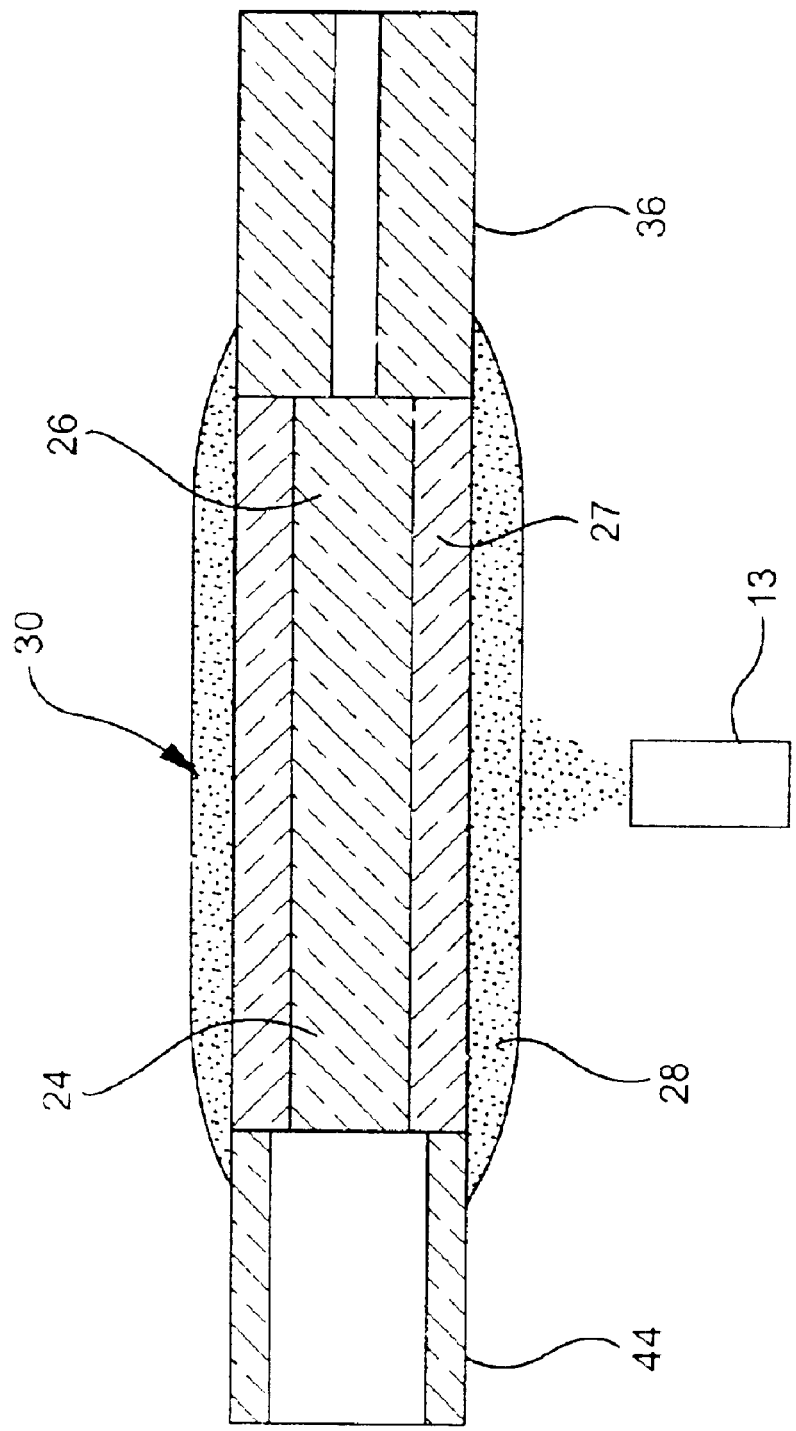
FIG. 6 is a schematic cross sectional view of the deposition of cladding on a core cane.

Depicted in FIG. 6, and generally designated by reference numeral 30, is an overcladded preform 26. Overcladded preform 26 comprises of a core cane 24 and soot 28. Preform 26 is exposed to the aforementioned atmosphere in a furnace 15 for a period of about 1 to about 6 hours at a temperature of about 1000 to about 1600° C. for drying.

It is preferred that the draw blank is exposed to the gas mixture before sintering. One preferred set of reaction parameters include a gas mixture including up to about 10 weight percent of $Cl_2$. A draw blank a used herein is meant to describe a preform that may be placed into a furnace and drawn into an optical fiber. Preferably, the furnace is heated to a temperature between about 1000 to about 1200° C., more preferably about 1125° C. The draw blank is treated with the gas mixture for preferably about 1 to about 4 hours. Optionally, the gas mixture is discharged from the furnace. The overcladded core cane is then sintered into a draw blank, as described above. The draw blank is preferably transported to a draw furnace and drawn into an optical fiber.

Another advantage of the disclosed invention, is that the aforementioned methods of the invention may be used to optimize the surface area of preform 12 for incorporating fluorine into preform 12. The surface area of preform 12 is typically reported in terms of area per unit of mass, e.g. $m^2/g$. It is beneficial to maintain the surface area of preform 12 as large as possible during fluorine doping to maximize the amount of fluorine incorporated into preform 12.

The inventors empirically have determined that the weight percent (wt %) of fluorine in a preform after doping the preform in accordance with invention is equal to about F wt $\% = 0.454 A^{0.545} P_{HF}^{0.521}$. The variable A comprises the surface area of the preform 12 and $P_{HF}$ comprises the partial pressure of HF in the doping atmosphere.

For additional background regarding drying, consolidation doping, consolidation, and/or sintering, the following U.S. patent applications are incorporated herein by reference, as if fully rewritten herein: (1) Ser. No. 09/671,790 filed on or about Sep. 27, 2000; (2) 60/295,360 filed on or about Jun. 1, 2000; (3) 60/257,341 filed on or about Dec. 20, 2000; (4) 60/258,061 filed on or about Dec. 22, 2000; (5) 60/295,052 filed on or about May 31, 2001; and (6) 60/295,360 filed on or about Jun. 1, 2001.

EXAMPLES

The invention will be further clarified by the following examples which are intended to be exemplary of the invention.

Example 1

Sootless Doping of Preform

In this example, nine (9) (samples A-I) silica soot preforms were formed by OVD. The deposition of eight (8) of the preforms included depositing fluorinated soot. The initial fluorine weight percent and rate of deposition for the fluorinated soot is provided below for each preform in table 1.

TABLE 1

| Preform | Deposition Rate of Fluorinate Soot (g/min) | Weight Percent of F (wt %) | Comments |
|---|---|---|---|
| A | N/A | 0 | Fluorine Free Deposition |
| B | 0.44 | 0.71 | |
| C | 0.12 | 1.46 | |
| D | 0.12 | 1.46 | |
| E | 0.06 | 1.81 | |
| F | 0.06 | 1.81 | |
| G | 0.06 | 1.81 | |
| H | 0.06 | 1.81 | |
| I | 0.06 | 1.81 | |

The mass of soot deposited on each preform ranged from about 1 gram to about 10 grams and then each preform was doped in accordance with the invention. A doping atmosphere was formed by reacting a fuel, $O_2$ and $CF_4$ in a hydrolysis burner. Each preform was exposed to the doping atmosphere for about the same time period minutes. The flow rates of each precursor to form the doping atmosphere are provided in table 2 in terms of slpm.

TABLE 2

| Preform | $O_2$ | $CH_4$ | CO | $CF_4$ | Fluorine Weight Percent after Doping |
|---|---|---|---|---|---|
| A | 17.67 | 6.3 | NA | 6.0 | 1.25 |
| B | 17.67 | 6.3 | NA | 6.0 | 1.66 |
| C | 11.67 | 6.3 | NA | 6.0 | 1.98 |
| D | 17.67 | 6.3 | NA | 6.0 | 2.06 |
| E | 14.84 | 3.15 | NA | 6.0 | 2.07 |
| F* | 11.67 | 6.3 | NA | 6.0 | 2.18 |
| G* | 11.67 | 6.3 | NA | 6.0 | 2.46 |
| H | 17.67 | 6.3 | NA | 6.0 | 2.48 |
| I | 19.5 | 0.52 | 19 | 6.0 | 3.83 |

*Flame precursors also included 2.0 slpm of $SiCl_4$.

The weight percent of fluorine in each soot preform was measured in accordance with a quantitative fluorine analysis method. A method may use pyrohydrolysis followed by ion selective electrode. The method that may be used to determine the fluorine weight percent in a soot preform comprises mixing a 200 mg sample of the soot with about 1500–2000 mg uranium trioxide. The mixture is heated in a pyrohydrolysis tube (available from Quartz Scientific, Inc., Fairport, Ohio) at about 1130° C. while steam is introduced into the tube.

Typically hydrogen fluoride is formed in a vapor phase and it is condensed. A sample of at least about 250 ml of the hydrogen fluoride is collected. 10 ml of the hydrogen fluoride is mixed with 10 ml of a buffer of TISAB (available from Fisher Scientific #SB175-4) for analysis. Usually ion selective electrodes (ISE) may be used to determine ppm of fluorine in the sample. The ISE may be available from Corning Incorporated of Corning, N.Y., such as model 255. The weight percent of fluorine is calculated from the ppm data collected.

Figure 7:
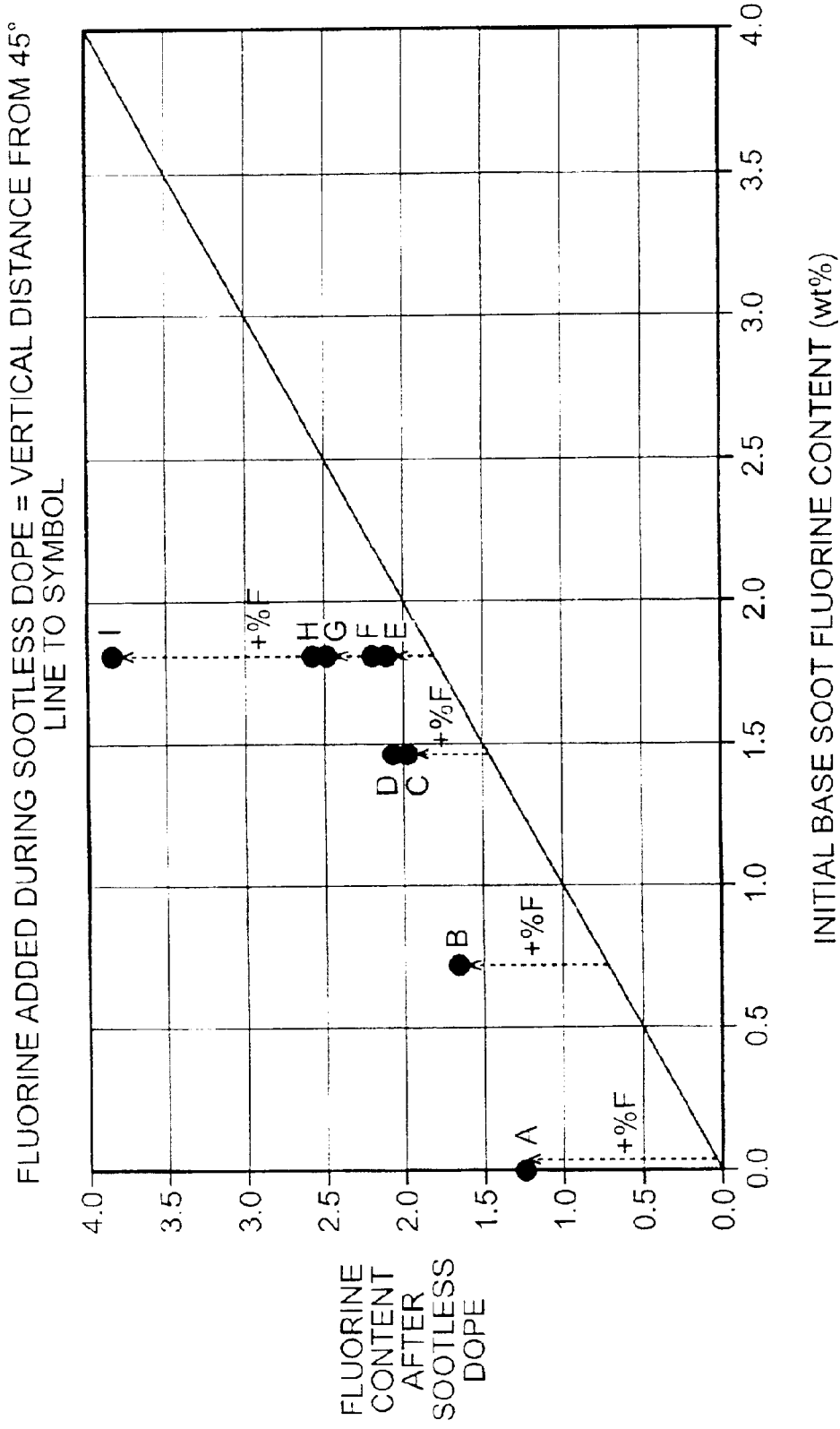
FIG. 7 is a graph of the increase in fluorine concentration in a perform that is doped in accordance with the invention.

The results of the flouring doping are illustrated in FIG. 7, generally designated 70. Each point on FIG. 7 indicates a final concentration of silica in one section of the soot preform. Each one of the dots on graph 70 discloses that amount of fluorine in the preform may be increased by practicing anyone of the aforementioned methods of the invention. As shown by the data points, "A-I" the amount of fluorine in each preform was increased. In at least two of the preforms, the amount of fluorine in the preform was increased by more than about 1.0%, see points A and B. With respect to point I, the amount of fluorine in the preform was increased by more than about 1.5%.

Example 2

Sootless Doping of Preform as a Function of Time

In this example several soot preforms were doped with a fluorine atmosphere generated by reacting $CF_4$, CO, and a fuel in the flame of a hydrolysis burner. Each preform was about 400–500 grams and had a diameter of about 2 cm. The flow rates of each was maintained substantially constant at about 3 slpm of $CF_4$, 3 slpm of a $CH_4$ fuel, and 12 slpm of CO. The burner was traversed along the length of the respective preform that was being doped. The amount of time that the soot preform was exposed to the doping atmosphere was varied. The perform was exposed to the fluorine atmosphere generated from the burner for about 5, about 15, about 30, or about 45 minutes.

A microprobe cross section was analyzed for each sample. A suitable microprobe that maybe used is a JEOL Superprobe model JXA 8900-R. When reference is made to a microprobe herein, the aforementioned apparatus is suitable for use in all microprobe applications cited herein.

Figure 8:
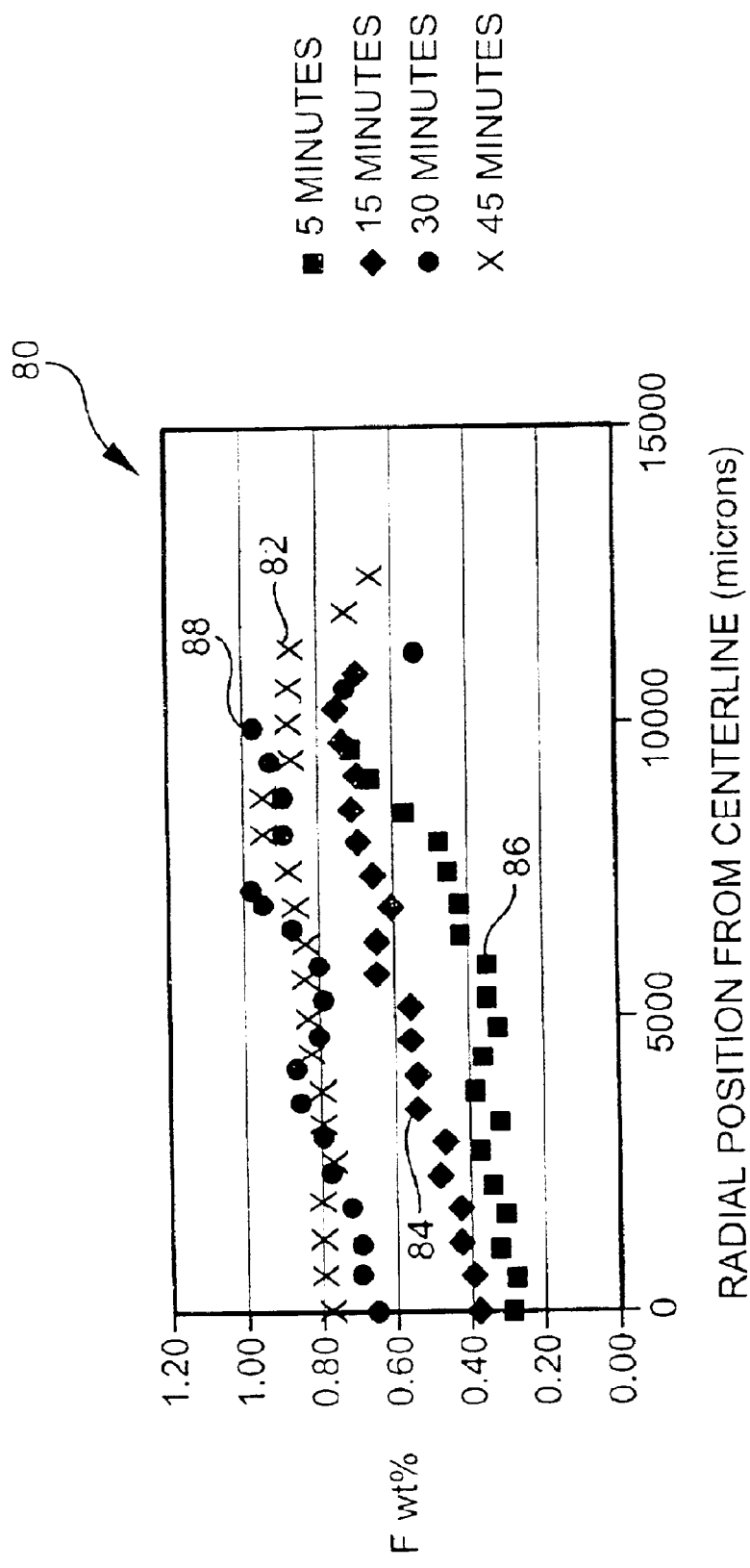
FIG. 8 is a graph of the fluorine wt % of a soot preform in terms of radius of the preform.

The results of the test are illustrated in FIG. 8, generally designated 80. In the example, the invention is used to dope a preform to a concentration of greater than 0.8% in at least one section. Line 82 represents the sample doped for forty-five (45) minutes. The fluorine concentration in the preform ranged from less than about 1.0 wt % to more than about 0.60 wt %. Line 88 represents the sample doped for thirty (30) minutes. The fluorine concentration in the preform ranged from up to about 1.0 wt % to less than about 0.60 wt %. Line 84 represents the preform doped for about 15 minutes. The fluorine weight % varied from less than about 0.4 wt % to less than about 0.80 wt %. Line 86 represents the preform doped for about 5 minutes. The fluorine concentration of the preform doped for about 5 minutes varied from about more than 0.2 wt % to less than about 0.8 wt %. The example also illustrates that for higher concentrations of fluorine into the soot preform, that longer doping periods are better than shorter doping periods.

Example 3

In this example the ratio of F to H in the flame was varied. In this example two preforms were formed, one with a low water flame and one with a standard methane flame. The low water flame included CO as a fuel in combination with $CH_4$, instead of a pure $CH_4$ flame and the ratio of F to H was about 1:1. In the low water flame, the flow rates of precursors into the flame were about 3.0 slpm of $CH_4$, about 10 slpm of $O_2$, about 12 slpm of CO, and about 3.0 slpm of $CF_4$. In the standard methane flame, the flow rates of precursors into the flame were about 10.0 slpm of $CH_4$, about 9.0 slpm of $O_2$, about and about 1.2 slpm of $CF_4$. The reaction product of the standard methane flame was about one-third water. Each preform was doped for a period of about 45 minutes.

The mass of each preform comprised about 400 to about 500 grams. The diameter of each preform was about 2.5 cm.

Figure 9:
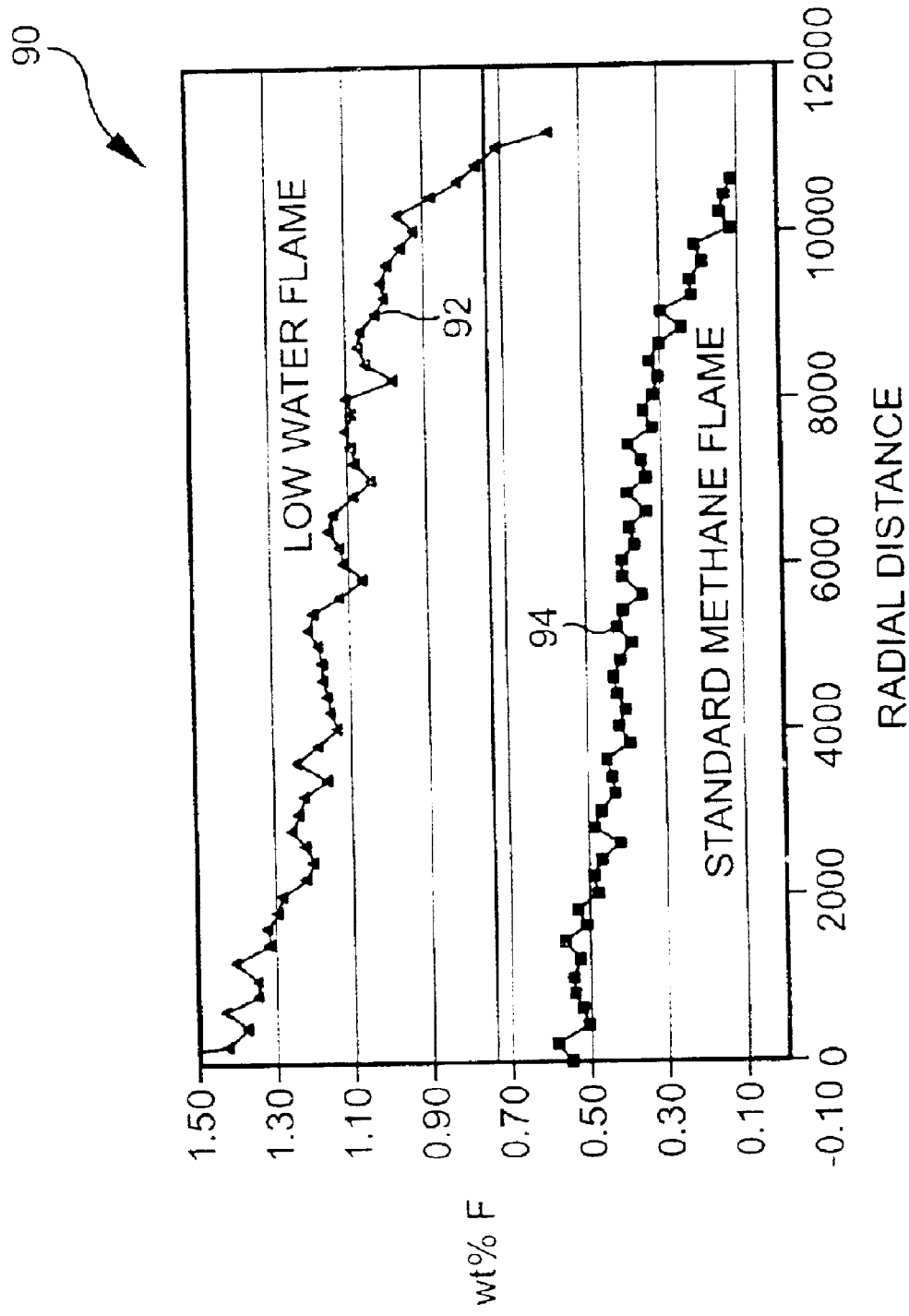
FIG. 9 is a graph of the fluorine wt % of a soot preform in terms of radius of the preform.

As in example 2, a microprobe was used to determine the fluorine weight percent of each soot perform as a function of radius. The preform which was doped with the low water flame exhibited a higher concentration of fluorine, as depicted in FIG. 9, generally designated 90. The concentration of fluorine in the preform doped with the low water flame ranged from about 1.50 wt % of fluorine or less to about more than about 0.50 wt %, see line 92 of FIG. 9. The concentration of fluorine in the preform doped with the standard methane flame ranged from more than about 0.50 wt % to more than about 0.10 wt %, see line 94 of FIG. 9.

Not to be bound by theory, it is believed that the low water flame may produce a higher partial pressure of hydrogen fluoride for the reason that the low water flame reaction does not include water as a reaction by-product to the same extent as the standard flame reaction does. Thus, the low water flame reaction does not have as much water present and the lack of water present adjusts the chemical equilibrium of the hydrogen fluoride forming reaction to favor the formation of hydrogen fluoride reaction product instead of the reactants.

Example 4

Single Doping Burner vs. Array of Doping Burners

This example compares the capture rate of fluorine in a sintered glass preform that is doped with a single traversing burner along the entire length of the preform as compared to an array of burners that traverse along the length of the preform. In this example two soot preforms were formed by OVD. The core section of each preform included a predetermined amount of germania doped silica soot. Each perform included a barrier layer followed radially outward by a region of undoped silica soot. With respect to the preform doped with the single burner, the barrier layer was located at a radial distance of about 3000 microns. As for the preform doped with the array of burners, the barrier layer was located at about a radial distance of about 2000 microns.

Figure 10:
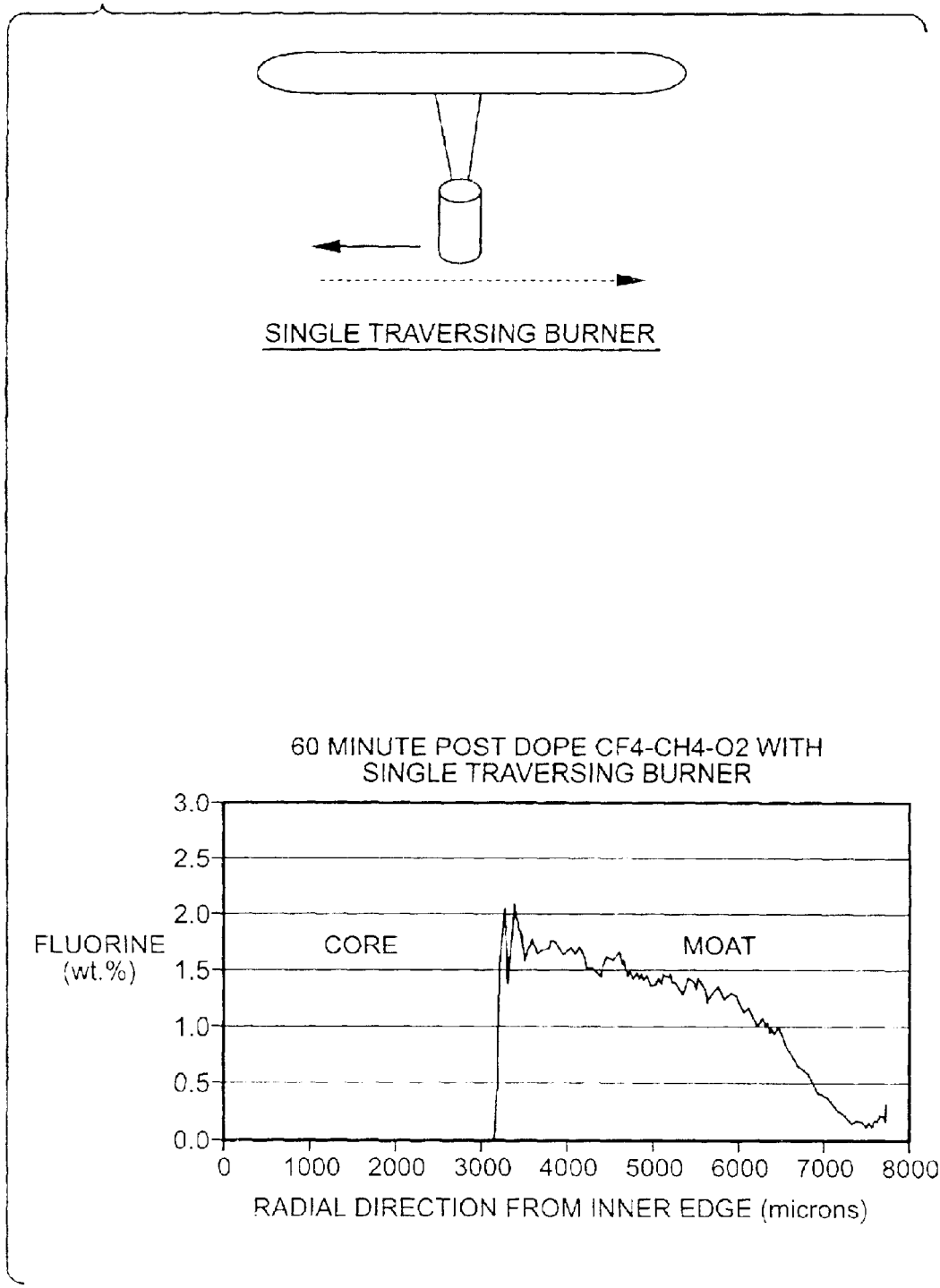

The results of the experiment are shown in FIGS. 10 and 11. In FIG. 10, the preform was doped with a single traversing burner for about 60 minutes. The doping atmosphere was the reaction product of the $CF_4$, $CH_4$, and $O_2$ precursors. The flow rate of precursors into the flame during the doping step comprises about 6.0 slpm of $CF_4$, 17.2 slpm of $O_2$, and 8 slpm of $CH_4$. The total amount of $CF_4$ comprised about 360 liters.

The preform represented in FIG. 11, was doped for ten minutes with the same precursors except an array of burners was used instead of a single burner. Each respective burner of the array of burners traversed along a particular segment of the preform. The flow rate of precursors into the flame during the doping step comprises about 9.0 slpm of $CF_4$, 11.3 slpm of $O_2$, and 12.0 slpm of $CH_4$. The total amount of $CF_4$ used comprised about 90 liters.

After each preform was doped as recited above, a microprobe was used to determine the fluorine weight percent of each perform as a function of radius. The preform in FIG. 10 that exhibited a fluorine doped region from about 3000 microns up to about 8000 microns. The concentration of fluorine in the preform varied from more than about 2.5 wt % to less than about 0.5% from the barrier layer to the radial distance of about 8000 microns. The average fluorine weight percent in the preform was about 1.0%. The preform depicted in FIG. 11 had a fluorine doped region that extended from about 2000 microns to more than about 7000 microns. The fluorine weight percent varied from about more than 2.0 wt % to less than 1.0 wt %. The average fluorine weight percent in the preform was about 1.7%. The fluorine concentration of the preform in FIG. 11 exhibited a downward trend in concentration from about 5000 microns to a radial distance of about more than 7000 microns.

From the above experiment, the fluorine concentration in the fluorine doped region is more uniform for a preform that is doped with an array of burners instead of a single traversing burner. Also the use of the array of burners instead of a single burner resulted in the preform having a higher concentration of fluorine than the preform doped with the single burner. Also the time period required to dope the preform with an array of burners was much shorter than the time period necessary to dope the preform with a single burner. Thus, doping a preform with an array of burners is a faster process than doping the preform with a single traversing burner.

Example 5

Effect of Doping Time

In this example, three soot preforms were formed by the OVD process having a CO flame. Each preform was heated to about 1000° C. with a CO flame for about 30 minutes prior to fluorine doping. Each preform was fluorine doped with a sootless flame for a particular period. The fluorine doping atmosphere was the reaction product of $CH_4$, $CF_4$, and $SF_6$. The flow rate of the precursors to form the doping atmosphere was the same for each of the three preforms, 12 slpm of $CH_4$, 11.3 slpm of $O_2$, 10 slpm of $CF_4$, and 5 slpm of $SF_6$. A microprobe was used to determine the fluorine weight percent of each soot perform as a function of radius.

Figure 12:
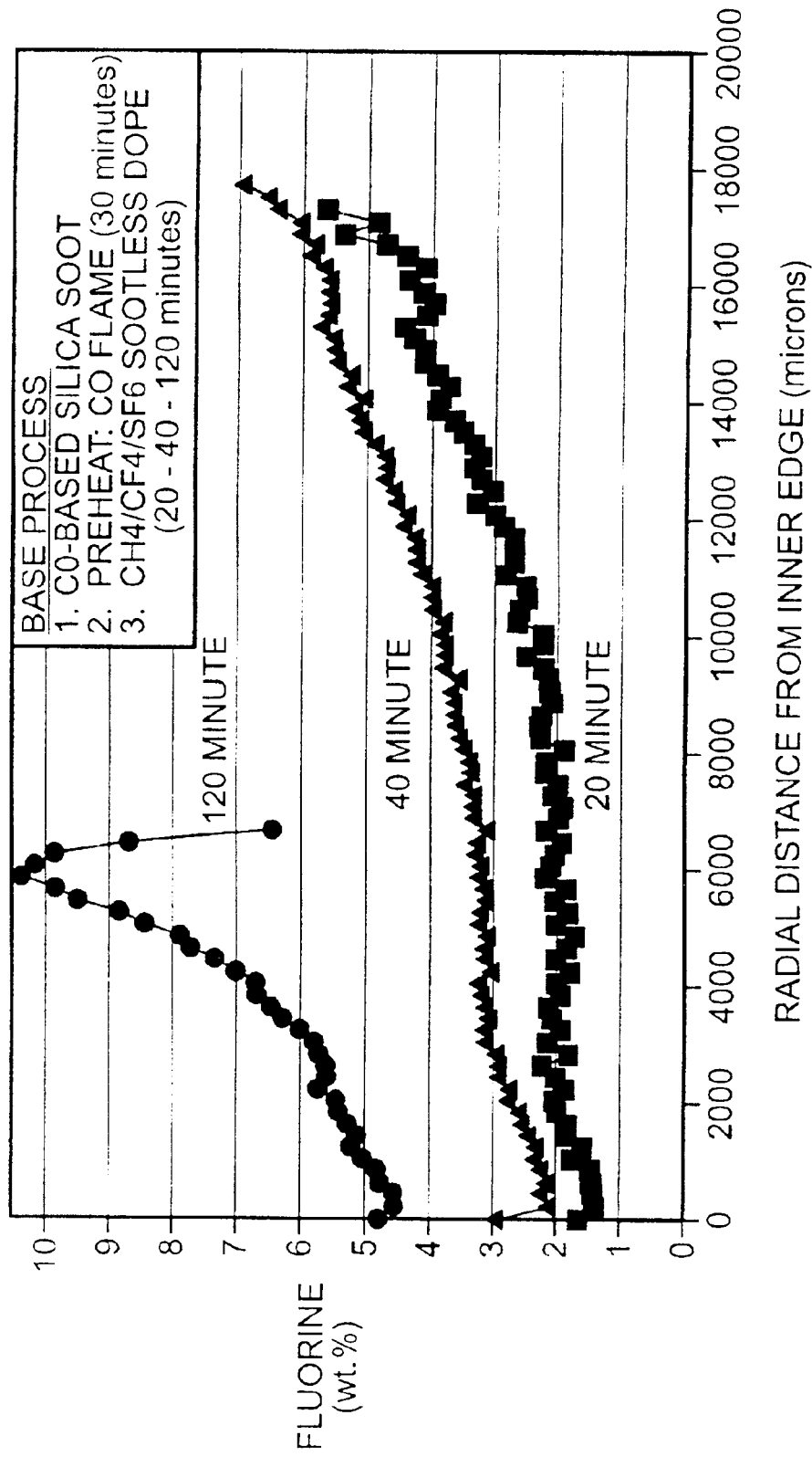
FIG. 12 is a graph of the fluorine wt % of a soot preform in terms of radius of the preform.

As depicted in FIG. 12, the doping period was either 20, 40, or 120 minutes. The preform which was doped for about 20 minutes exhibited a fluorine concentration that varied from about less than 2 wt % at a radial distance of 0 to less than about 6% at a radial distance of less than about 1800 microns. The preform which was doped for about 40 minutes exhibited a fluorine concentration that varied from about 3 wt % or less at a radial distance of about 4000 microns or less to about 7% at a radial distance of less than about 1800 microns. The preform that was doped for about 120 minutes exhibited a fluorine concentration that varied from about less than 5 wt % to more than about 10 wt %. At a radial distance of less than 2000 microns, the preform exhibited a fluorine wt % of less than 5% and at a radial distance of less than about 6000 microns, the preform exhibited a fluorine wt % of more than 10%.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A method of making an optical fiber preform comprising:
   forming a glass soot in a flame of a combustion burner;
   depositing the soot onto a stalling member to form an optical fiber soot preform;
   reacting a fluorine containing precursor in said flame without forming a soot, thereby forming a fluorine doping atmosphere;
   exposing the soot preform to said fluorine doping atmosphere so as to dope the soot preform with flourine.

2. The method according to claim 1 wherein said combustion burner comprises an array of burners, wherein said array has a length substantially the same as the length of said preform.

3. The method according to claim 1 wherein a reaction product of said reacting comprises hydrogen fluoride.

4. The method according to claim 1 wherein a fuel of the flame comprises a hydrogen containing compound.

5. The method according to claim 1 wherein a ratio of fluorine in the precursor to hydrogen in a fuel of the flame comprises about 1:1.

6. The method according to claim 1 wherein said soot comprises at least one of the following types of soot: undoped soot, fluorine-doped soot, germanium-doped soot, phosphorus-doped soot, aluminum doped soot, antimony-doped soot, tantalum-doped soot, and combinations thereof.

7. The method according to claim 1 wherein a fuel for the flame comprises a substantially hydrogen free compound.

8. The method according to claim 1 wherein a reaction temperature of said reacting comprises at least about 500° C. and less than about 1200° C.

9. The method according to claim 1 further comprising preheating said soot preform to a substantially uniform radial temperature below the sintering temperature of said soot preform.

10. The method according to claim 1 wherein a reaction temperature of said reacting comprises a temperature below the sintering temperature of the soot preform.

11. The method according to claim 1 further comprising maintaining a partial pressure of fluorine doping atmosphere at a substantially constant value.

12. The method according to claim 1 further comprising maintaining a temperature of said soot preform at a substantially uniform radial temperature.

13. The method according to claim 1 wherein a ratio of fluorine in the precursor to hydrogen in a fuel of the flame comprises about 2:1 or greater.

14. The method according to claim 1 further comprising aligning said burner adjacent said soot preform in a radial direction.

15. The method according to claim 1 further comprising aligning said burner axially to said soot preform.

16. The method according to claim 1 wherein a product of said reacting comprises at least about 0.1% by volume at least one component of the group consisting of $COF$, $COF_3$, $COF_2$, $S_2F_2$, $SOF_2$, and combinations thereof.

17. The method according to claim 1 further comprising applying heat to said soot preform by a source other than the burner during said reacting step.

18. The method according to claim 17 wherein said source comprises at least one heat lamp.

19. The method according to claim 1 further comprising partially enclosing said soot preform in an enclosure wherein a distance between the enclosure and the preform comprises no more than about 12 cm.

20. The method according to claim 1 further comprising introducing a chlorine containing precursor into said flame.

21. The method according to claim 1 wherein a product of said reacting comprises at least about 0.1% by volume at least one component of the group consisting of $COF_2$, $S_2F_2$, $SOF_2$, and combinations thereof.

22. A method of doping an optical fiber preform comprising:
reacting at least a fluorine containing precursor in a flame of a combustion burner, wherein the precursors reacted in the flame are substantially devoid of a silicon containing compound that may be reacted in said flame to form a soot particle, thereby forming a fluorine containing atmosphere for the doping of a soot preform.

23. The method according to claim 22 wherein said combustion burner comprises an array of burners, wherein said array has length substantially the same as the length of said preform.

24. The method according to claim 22 wherein a reaction product of said reacting comprises hydrogen fluoride.

25. The method according to claim 22 wherein a fuel of the flame comprises a hydrogen containing compound.

26. The method according to claim 22 further comprising preheating said soot preform to a substantially uniform radial temperature below the sintering temperature of a soot preform.

27. The method according to claim 22 wherein a reaction temperature of said reacting comprises a temperature below the sintering temperature of a soot preform.

28. The method according to claim 22 further comprising maintaining a partial pressure of fluorine in an atmosphere created from said reacting at a substantially constant value.

29. A method of making an optical fiber comprising:
forming a glass soot in a flame of a combustion burner;
depositing the soot onto a starting member to form an optical fiber soot preform;
reacting at least one precursor in the flame of said combustion burner, wherein said precursors comprise at least one fluorine containing compound and said precursors are substantially free of any silicon containing compound;
directing a reaction product of said reacting step toward said soot preform so as to dope the soot preform with fluorine;
drawing the sintered preform to form an optical fiber.

30. The method according to claim 1 wherein a ratio of fluorine in the precursor to hydrogen in a fuel of the flame comprises about 1:1.

31. The method according to claim 1 wherein a product of said reacting comprises at least about 0.1% by volume at least one compound containing fluorine and substantially devoid of hydrogen.

32. The method according to claim 1 wherein the starting member is a core cane.

33. The method according to claim 29 wherein the starting member is a core cane.

* * * * *

UNITED STATES PATENT AND TRADEMARK OFFICE
CERTIFICATE OF CORRECTION

PATENT NO. : 6,813,907 B2
DATED : November 9, 2004
INVENTOR(S) : Dawes et al.

It is certified that error appears in the above-identified patent and that said Letters Patent is hereby corrected as shown below:

Column 14,
Line 8, "depositing the soot onto a stalling member"
should be -- depositing the soot onto a starting member --

Column 16,
Line 16, after "fluorine" insert -- sintering said fluorine doped perform; and --

Signed and Sealed this

Twenty-fourth Day of May, 2005

JON W. DUDAS
*Director of the United States Patent and Trademark Office*